United States Patent
Sun et al.

(10) Patent No.: US 9,401,874 B2
(45) Date of Patent: Jul. 26, 2016

(54) MINIMIZING COVERAGE HOLES IN A COMMUNICATION NETWORK

(71) Applicant: QUALCOMM Incorporated, San Diego, CA (US)

(72) Inventors: Yanjun Sun, San Diego, CA (US); Peerapol Tinnakornsrisuphap, San Diego, CA (US); Sai Yiu Duncan Ho, San Diego, CA (US); Bibhu Prasad Mohanty, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 206 days.

(21) Appl. No.: 13/966,901

(22) Filed: Aug. 14, 2013

(65) Prior Publication Data
US 2015/0052255 A1 Feb. 19, 2015

(51) Int. Cl.
*G06F 15/16* (2006.01)
*H04L 12/937* (2013.01)
*H04W 76/02* (2009.01)
*H04W 24/06* (2009.01)
*H04W 84/12* (2009.01)

(52) U.S. Cl.
CPC .......... *H04L 49/253* (2013.01); *H04W 76/027* (2013.01); *H04W 24/06* (2013.01); *H04W 84/12* (2013.01)

(58) Field of Classification Search
CPC ..... H04W 76/027; H04W 24/06; H04W 8/12; H04W 36/00; H04W 4/021
USPC ........... 709/203, 220, 223, 227; 455/436, 451
See application file for complete search history.

(56) References Cited

U.S. PATENT DOCUMENTS

| 6,625,132 B1 * | 9/2003 | Boettger et al. ............... 370/329 |
| 7,499,718 B2 | 3/2009 | Stephenson et al. |
| 8,370,629 B1 | 2/2013 | Ngo et al. |
| 8,400,268 B1 * | 3/2013 | Malik et al. ................... 340/8.1 |

(Continued)

FOREIGN PATENT DOCUMENTS

| EP | 2086264 | 8/2009 |
| EP | 2533573 | 12/2012 |

OTHER PUBLICATIONS

"PCT Application No. PCT/US2014/051149 International Search Report", Apr. 8, 2015, 38 Pages.

(Continued)

*Primary Examiner* — Michael Y Won
(74) *Attorney, Agent, or Firm* — DeLizio Law, PLLC

(57) ABSTRACT

Access point functionality of a network device may be disabled, resulting in a coverage hole in a communication network and affecting performance of a client device. Various techniques can be implemented for detecting and minimizing coverage holes. In one embodiment, the network device can selectively establish a communication link with the client device depending on whether the client device is in a coverage hole and depending on whether the client device can detect another access point in the communication network. In some embodiments, the client device can determine that it is in a coverage hole in response to detecting a reserved SSID and can accordingly notify a central coordinator of the communication network. In some embodiments, the central coordinator can identify the network device (with disabled access point functionality) that can eliminate the coverage hole and can cause the network device to enable its access point functionality.

29 Claims, 7 Drawing Sheets

(56) References Cited

U.S. PATENT DOCUMENTS

| | | | |
|---|---|---|---|
| 8,588,871 B1* | 11/2013 | Arnold | 455/574 |
| 2003/0100299 A1* | 5/2003 | Ko et al. | 455/423 |
| 2003/0157895 A1* | 8/2003 | Agrawal et al. | 455/67.1 |
| 2004/0090943 A1 | 5/2004 | Da Costa et al. | |
| 2005/0003827 A1* | 1/2005 | Whelan | 455/454 |
| 2005/0048963 A1 | 3/2005 | Kubler et al. | |
| 2006/0075131 A1* | 4/2006 | Douglas et al. | 709/230 |
| 2007/0026818 A1 | 2/2007 | Willins et al. | |
| 2007/0249291 A1* | 10/2007 | Nanda et al. | 455/73 |
| 2008/0032727 A1* | 2/2008 | Stephenson et al. | 455/513 |
| 2008/0188200 A1* | 8/2008 | Forsberg | H04W 12/04 455/410 |
| 2008/0198811 A1 | 8/2008 | Deshpande et al. | |
| 2009/0196211 A1* | 8/2009 | Wentink | 370/311 |
| 2009/0279521 A1* | 11/2009 | Ikeda | 370/338 |
| 2010/0079599 A1* | 4/2010 | Kanma | 348/207.1 |
| 2010/0087208 A1* | 4/2010 | Lister | 455/456.5 |
| 2011/0039570 A1* | 2/2011 | Maida et al. | 455/452.2 |
| 2011/0130144 A1* | 6/2011 | Schein et al. | 455/442 |
| 2011/0195707 A1 | 8/2011 | Faerber et al. | |
| 2012/0100847 A1* | 4/2012 | Rahman | 455/424 |
| 2012/0129460 A1* | 5/2012 | Hodis et al. | 455/67.11 |
| 2012/0218931 A1 | 8/2012 | Iyer et al. | |
| 2012/0243474 A1 | 9/2012 | Iyer et al. | |
| 2013/0018581 A1* | 1/2013 | Sidhu et al. | 701/469 |
| 2013/0217385 A1* | 8/2013 | Das et al. | 455/434 |
| 2013/0237231 A1* | 9/2013 | Nagaraja et al. | 455/438 |
| 2013/0272285 A1* | 10/2013 | Goldsmith et al. | 370/338 |
| 2013/0308470 A1* | 11/2013 | Bevan et al. | 370/252 |
| 2014/0029520 A1* | 1/2014 | Farricker | 370/329 |
| 2014/0187272 A1* | 7/2014 | Sydir et al. | 455/456.5 |
| 2014/0206361 A1* | 7/2014 | Centonza et al. | 455/444 |
| 2014/0293790 A1* | 10/2014 | Xiao et al. | 370/235 |
| 2014/0328190 A1* | 11/2014 | Lord et al. | 370/252 |
| 2014/0376448 A1* | 12/2014 | Kao et al. | 370/315 |
| 2015/0052255 A1* | 2/2015 | Sun et al. | 709/227 |
| 2015/0215798 A1* | 7/2015 | Choi et al. | 455/424 |

OTHER PUBLICATIONS

"PCT Application No. PCT/US2014/051149 Invitation to Pay Additional Fees and Partial Search Report", Dec. 17, 2014, 7 pages.

* cited by examiner

US 9,401,874 B2

MINIMIZING COVERAGE HOLES IN A COMMUNICATION NETWORK

BACKGROUND

Embodiments of the inventive subject matter generally relate to the field of communication networks and, more particularly, to detecting and minimizing coverage holes in a communication network.

Hybrid communication networks typically comprise multiple networking technologies (e.g., wireless local area network (WLAN) technologies, powerline communication (PLC) technologies, Ethernet, etc.). Typically, the communication mechanisms and protocol specifics are unique to each networking technology. For example, device and topology discovery mechanisms, inter-network bridging mechanisms, etc. may vary from one networking technology of a hybrid communication network to the next. The networking technologies are typically interconnected using bridging-capable devices that forward frames between the different network technologies and media to form a single, extended communication network.

SUMMARY

Various embodiments for detecting and minimizing coverage holes in a communication network are disclosed. In one embodiment, a first access point of a communication network receives a first request from a client device to establish a communication link between the first access point and the client device. After establishing the communication link between the first access point and the client device, the first access point causes the client device to disassociate from the first access point. The first access point determines whether a second request is received from the client device to establish the communication link between the first access point and the client device. The first access point determines whether the client device is in a coverage hole and whether to establish the communication link between the first access point and the client device based, at least in part, on whether the second request is received from the client device.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
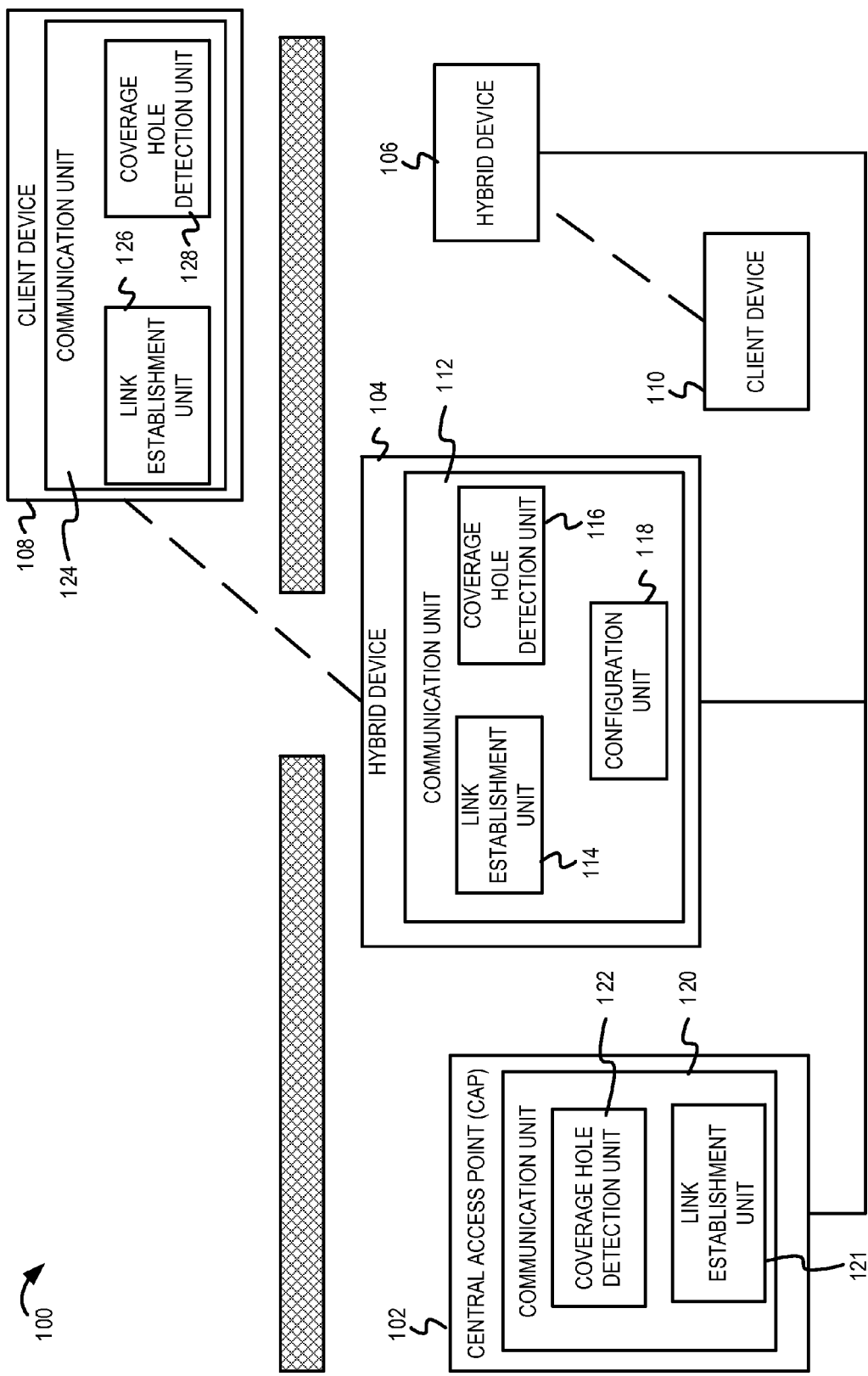
FIG. 1 is a block diagram illustrating example operations for minimizing coverage holes in a communication network.
Figure 2:
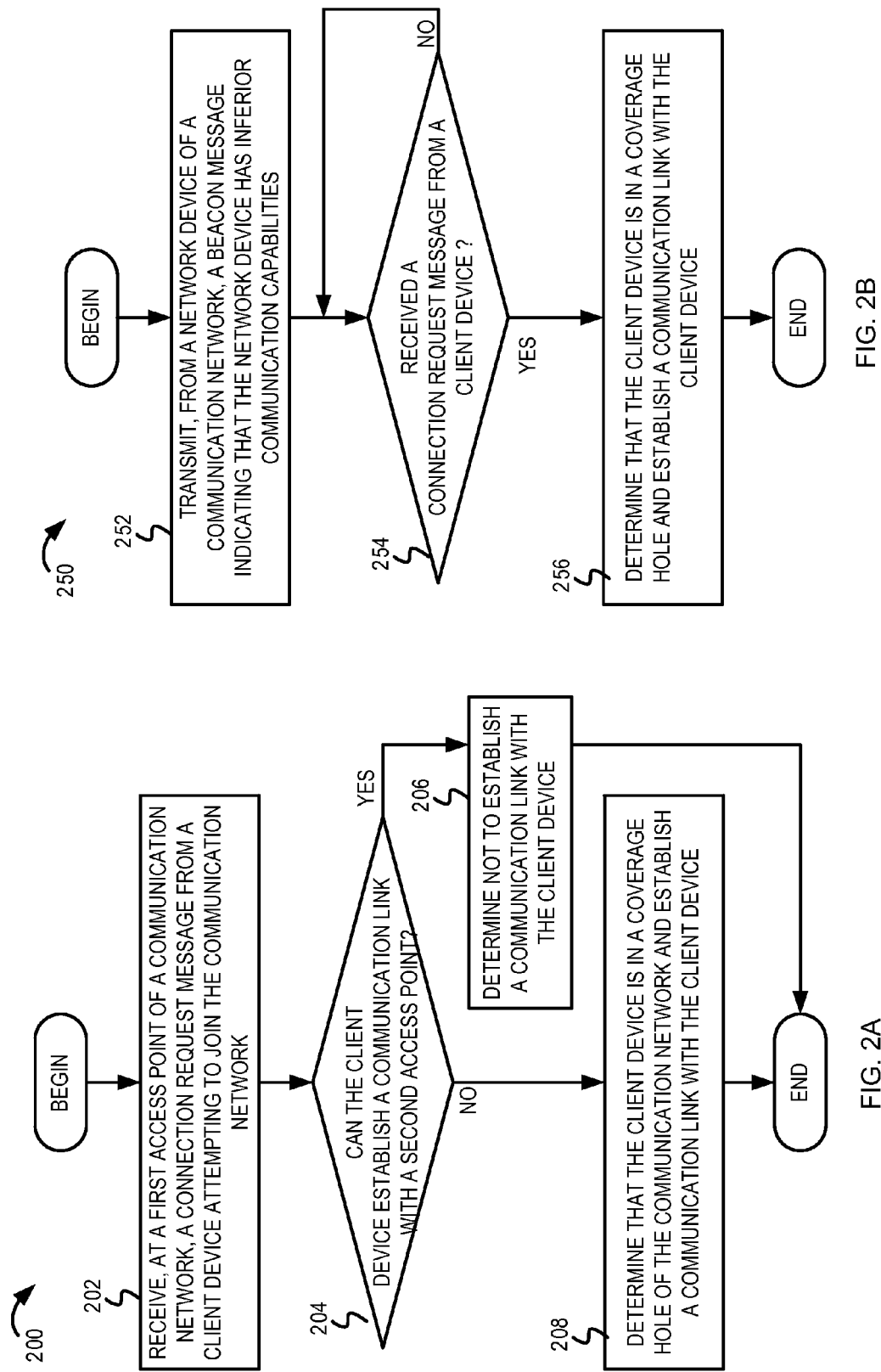
FIG. 2A is a flow diagram illustrating example operations for determining whether a client device is in a coverage hole.
FIG. 2B is a flow diagram illustrating example operations of one embodiment for selectively establishing a communication link with a client device

The description that follows includes exemplary systems, methods, techniques, instruction sequences, and computer program products that embody techniques of the present inventive subject matter. However, it is understood that the described embodiments may be practiced without these specific details. For example, although in some embodiments the coverage hole detection operations can be implemented in a wireless local area network (WLAN) (e.g., IEEE 802.11 network), embodiments are not so limited. In other embodiments, the coverage hole detection operations described herein can be implemented for other suitable networks (e.g., powerline communication (PLC), Ethernet, Multimedia over Coax Alliance (MoCA), WiMAX, etc.). As another example, although examples describe the coverage hole detection operations being implemented in a hybrid communication network comprising hybrid devices that connect to a WLAN, a PLC network (e.g., HomePlug® AV network), and Ethernet, embodiments are not so limited. In other embodiments, coverage hole detection operations described herein can be implemented for hybrid communication networks comprising other suitable types of network devices that implement other standards/protocols (e.g., multimedia over coax alliance (MoCA®), WiMAX®, etc.). It is further noted that although examples describe a hybrid device executing the coverage hole detection operations, embodiments are not so limited. In other embodiments, other suitable network devices (e.g., a dedicated WLAN device) may execute the coverage hole detection operations described herein. In other instances, well-known instruction instances, protocols, structures, and techniques have not been shown in detail in order not to obfuscate the description.

A communication network may comprise multiple access points to ensure that a client device has seamless WLAN coverage and connectivity. However, in some instances, although the communication network may comprise multiple network devices with access point (AP) functionality, not all AP-capable network devices may be configured to operate as access points. For example, the AP functionality may be disabled on some of the AP-capable network devices to minimize interference/overlap between access points, to disable access points with poor performance in the communication network, etc. Thus, an AP-capable network device may be configured to operate as a client device, even though it may have AP functionality. The AP-capable network device with disabled AP functionality may not broadcast a beacon message, indicate/advertise its presence in the communication network, or perform other operations typically performed by an access point. Accordingly, a client device attempting to join the communication network may not detect and join the communication network via the AP-capable network device with disabled AP functionality. Because the AP functionality of some of the network devices in the communication network may be disabled, the client device attempting to join the communication network may not detect any access point in the communication network. In other words, the client device may be in an area of poor network coverage or no network coverage. Such an area in the communication network that has poor (or no) network coverage is herein referred to as a "coverage hole." Coverage holes may occur in the communication network because AP functionality of some of the AP-capable network devices may be disabled, because the communication network may not comprise a sufficient number of AP-capable network devices with enabled AP functionality to service the communication network, etc. Coverage holes may limit the coverage of the communication network and may degrade the performance of the communication network.

Functionality can be implemented to detect and fix coverage holes in a communication network based on information provided by a client device attempting to join the communication network. In some embodiments, as will be further described in FIGS. 2A-4, instead of disabling the AP functionality, a network device with the AP functionality can be configured to selectively establish a communication link with the client device depending on whether the client device can detect another access point of the communication network (i.e., depending on whether the client device is in a coverage hole). In another embodiment as will be further described in FIGS. 5 and 6, the client device can be configured to determine whether it is in a coverage hole and to notify a central coordinator of the communication network. The central coordinator (in conjunction with the client device) can determine to enable the AP functionality of one of the network devices in the communication network to address the coverage hole. These and other features for detecting and minimizing coverage holes will be further described below. Such a mechanism for detecting and resolving a coverage hole in the communication network can ensure that a client device has adequate WLAN coverage in the communication network.

FIG. 1 is a block diagram illustrating example operations for minimizing coverage holes in a communication network 100. The communication network 100 comprises a central access point (CAP) 102, hybrid devices 104 and 106, and client devices 108 and 110. The hybrid device 104 comprises a communication unit 112. The communication unit 112 comprises a link establishment unit 114, a coverage hole detection unit 116, and a configuration unit 118. Likewise, although not depicted in FIG. 1, the hybrid device 106 can also comprise a communication unit including a link establishment unit, a coverage hole detection unit, and a configuration unit. The CAP 102 comprises a communication unit 120. The communication unit 120 comprises a link establishment unit 121 and a coverage hole detection unit 122. The client device 108 comprises a communication unit 124. The communication unit 124 comprises a link establishment unit 126 and a coverage hole detection unit 128. Likewise, although not depicted in FIG. 1, the client device 110 can also comprise a communication unit including a link establishment unit and a coverage hole detection unit. In some implementations, although not shown in FIG. 1, the CAP 102 may also include a configuration unit 118. The functionality associated with the link establishment unit, the coverage hole detection unit, and the configuration unit of the corresponding network devices of the communication network 100 will be further described below. Furthermore, although not depicted in FIG. 1, the communication network 100 may be a hybrid communication network comprising two or more interconnected network segments. For example, the hybrid communication network 100 may be formed by an interconnection of a WLAN segment, a powerline network segment, and an Ethernet segment.

In some embodiments, the hybrid devices 104 and 106 and the CAP 102 may each be IEEE Std. 1905.1 compatible devices. The hybrid devices 104 and 106 and the CAP 102 may each comprise multiple network interfaces (e.g., a WLAN interface, a PLC interface, and an Ethernet interface) that couple the hybrid device to a corresponding network segment (e.g., a WLAN segment, a powerline network segment, and an Ethernet segment) of the hybrid communication network 100. In some embodiments, the client devices 108 and 110 can each be WLAN devices; while in other embodiments, the client devices 108 and 110 can also be hybrid devices that can exchange communications via multiple communication networks. In some embodiments, the communication network 100 may be a WLAN communication network and the hybrid devices 104 and 106 may be WLAN access points or other WLAN-compatible network devices with WLAN access point and WLAN client device functionality (e.g., a WLAN to Ethernet adapter, a cable television set-top box, a WLAN-enabled television, a computer, etc.). In one example, the CAP 102 and the hybrid devices 104 and 106 can each be network devices with WLAN AP functionality. In another example, hybrid devices 104 and 106 can each be WLAN access points. In yet another example, the CAP 102 can be a WLAN access point that may be configured to communicate via other communication networks (e.g., a cellular network).

In some implementations, the CAP 102, the hybrid devices 104 and 106, and/or the client devices 108 and 110 may each be an electronic device such as a laptop computer, a tablet computer, a mobile phone, a smart appliance, a gaming console, a dedicated access point, or other suitable electronic devices with various communication capabilities (e.g., WLAN communication capabilities, PLC capabilities, Ethernet communication capabilities, etc.). In some embodiments, in addition to WLAN communication protocols (e.g., IEEE 802.11 communication protocols), the CAP 102, the hybrid devices 104 and 106, and the client devices 108 and 110 can implement other protocols and functionality to enable other types of communications (e.g., Bluetooth®, WiMAX, Ethernet, PLC, etc.). For example, the communication units of the CAP 102, the hybrid devices 104 and 106, and the client devices 108 and 110 can each include one or more radio transceivers, processors, memory, and other logic to implement the communication protocols and related functionality.

A hybrid device with WLAN communication capabilities can be configured to operate as a WLAN access point (AP) or a WLAN client device (STA). For example, the hybrid device 106 may include a WLAN radio transceiver (not shown in FIG. 1), and can be configured to operate as a WLAN access point (AP) or a WLAN client device (STA). If configured to operate as a WLAN access point, the hybrid device 106 can periodically broadcast a beacon message (via the WLAN radio transceiver), so that other WLAN client devices attempting to join the communication network 100 can detect and establish communication link with the hybrid device 106. After the communication link is established, the hybrid device 106 can relay (e.g., via the WLAN radio transceiver) messages/packets to and from the WLAN client device. If the hybrid device 106 (e.g., the WLAN radio transceiver) is configured to operate as an access point, the hybrid device 106 may be referred to as a "hybrid router" (HR) or a "hybrid range extender" (HRE). If configured to operate as a WLAN client device, the hybrid device 104 does not broadcast a beacon message to indicate its presence in the communication network 100. Accordingly, if the hybrid device 104 (e.g., the WLAN radio transceiver) is configured to operate as a WLAN client device, the hybrid device 104 may not associate with and relay traffic from other WLAN client devices. If the hybrid device 104 is configured to operate as a client device, the hybrid device 104 may be referred to as a "hybrid client" (HC). In some embodiments, the hybrid device 104 may comprise a WLAN access point module and a WLAN client device module. In this embodiment, if the WLAN access point module is disabled, the hybrid device 104 may be referred to as a hybrid client. However, if the WLAN access point module is enabled/activated, the hybrid device 104 may operate as a WLAN access point and may be referred to as a hybrid router or a hybrid range extender.

In some embodiments, the CAP 102 (or a network administrator) may configure a hybrid device 104 as a hybrid router or a hybrid client of the communication network 100 depending on whether the hybrid device 104 is needed for providing WLAN coverage in the communication network 100. With reference to the example of FIG. 1, the hybrid device 104 may be configured to operate as a hybrid client (i.e., WLAN AP functionality may be disabled or otherwise unavailable) if the hybrid device 104 is not needed for providing WLAN coverage (e.g., if the WLAN coverage area of the hybrid device 104 falls within the WLAN coverage area of the hybrid device 106). As another example, the hybrid device 104 may be configured to operate as a hybrid client if configuring both the hybrid devices 104 and 106 as a hybrid router will negatively affect the performance of the communication network 100 (e.g., because of contention between access points of the hybrid devices 104 and 106). In other embodiments, the hybrid device 104 may be configured to operate as a hybrid router or a hybrid client depending on performance of the hybrid device 104. For example, the hybrid device 104 may be configured to operate as a hybrid client if the hybrid device 104 has a poor connection (e.g., low signal strength, high attenuation, high error rate, low data rate, etc.) to the backhaul (e.g., the CAP 102) of the communication network 100. As another example, the hybrid device 104 may be configured to operate as a hybrid client for power conservation, to avoid/minimize contention among WLAN communications, etc. In the example of FIG. 1, the hybrid device 106 may be configured to operate as a hybrid router. For example, the WLAN radio transceiver of the hybrid device 106 may be configured to operate as a WLAN access point, WLAN AP functionality of the hybrid device 106 may be enabled, etc. In the example of FIG. 1, the hybrid device 104 may be configured to operate as a hybrid client. For example, the WLAN radio transceiver of the hybrid device 106 may be configured to operate as a WLAN client device, WLAN AP functionality of the hybrid device 104 may be disabled at the hybrid device 106, etc.

Consequently, not all the hybrid devices that have AP functionality ("AP-capable hybrid devices") may be "visible" to a client device attempting to join the communication network 100. In the example of FIG. 1, the client device 110 may detect a beacon message from the hybrid device 106 configured to operate as a hybrid router (i.e., WLAN AP functionality is enabled). However, the client device 110 may not detect a beacon message from the hybrid device 104 configured to operate as a hybrid client (i.e., WLAN AP functionality is disabled). Therefore, the client device 110 may establish a communication link with and join the communication network 100 via the hybrid device 106. However, when the client device 108 tries to join the communication network 100, the client device 108 may not detect a beacon message from any AP-capable hybrid devices in the communication network 100. For example, the client device 108 may not detect a beacon message from the hybrid client 104. Also, the client device 108 may not detect a beacon message from the hybrid router 106 if the client device 108 is in a high attenuation environment (e.g., behind a concrete wall, depicted by cross-hatched lines in FIG. 1). In some embodiments, such areas in the communication network 100 at which the client device 108 cannot receive WLAN coverage (e.g., does not detect any access point, hybrid router, hybrid range extender, etc.) are referred to as coverage holes. In other embodiments, the client device 108 may also be considered to be in a coverage hole if the client device 108 cannot detect a preferred level of WLAN coverage (e.g., if the client device 108 detects a weak signal strength from an access point, a low data rate, high error rate, high attenuation, etc.).

In the example of FIG. 1, the client device 108 could have connected to the communication network 100 via the hybrid device 104, if the AP functionality of the hybrid device 104 was enabled. As will be further described below with reference to FIGS. 1-6, the hybrid device 104, the client device 108 (in the coverage hole), and/or the CAP 102 can execute operations to detect the coverage hole and minimize/eliminate the coverage hole in the communication network 100. Thus, the hybrid client 104 can be reconfigured to operate as a hybrid router (e.g., the WLAN radio transceiver of the hybrid device 104 can be configured to operate as an access point, AP functionality of the hybrid device 104 can be enabled, etc.) if the client device 108 attempting to join the communication network 100 is in a coverage hole. For example, the CAP 102 can notify the configuration unit 118 regarding whether AP functionality of the hybrid device 104 should be enabled or disabled. The configuration unit 118 can provide a control signal to a WLAN module of the hybrid device to enable or disable AP functionality.

In some embodiments, as will be further described in FIGS. 2A-4, instead of disabling the AP functionality of the hybrid device 104, the hybrid device 104 can be configured to selectively accept connection request messages from a client device, depending on whether the client device is in a coverage hole. The hybrid device 104 can enable/activate its WLAN AP functionality and can indicate its presence in the communication network 100 (e.g., by periodically transmitting beacon messages). The link establishment unit 114 of the hybrid device 104 can establish a communication link and relay traffic for a client device 108 only when the client device 108 cannot locate another WLAN access point with which to establish a communication link. In the example of FIG. 1, the client devices 108 and 110 can each detect the hybrid device 104 and transmit a connection request message to the hybrid device 104. The hybrid device 104 may determine that the client device 108 can only join the communication network 100 via the hybrid device 104. For example, the coverage hole detection unit 116 may determine that the client device 108 cannot detect another access point in the communication network 100. Accordingly, the hybrid device 104 can determine that the client device 108 is in a coverage hole, establish a communication link with the client device 108, and relay traffic for the client device 108. Alternately, the coverage hole detection unit 116 may determine that the client device 110 can join the communication network 100 via another access point (e.g., the hybrid device 106). Accordingly, the hybrid device 104 can determine that the client device 110 is not in a coverage hole and may not establish a communication link with the client device 110 (e.g., reject/ignore the connection request message from the client device 110). In other words, the hybrid device 104 can operate as a hybrid router for the client device 108 that cannot detect (or find an acceptable connection to the communication network 100 via) an existing access point (i.e., the CAP 102 or the hybrid device 106). The hybrid device 104 can operate as a hybrid client for the client device 110 that can detect and establish a good connection via an existing access point.

In another embodiment, the hybrid client 104 can temporarily enable AP functionality. As will be further described below with reference to FIG. 5, the link establishment unit 114 of the hybrid device 104 can broadcast a reserved service set identifier (SSID) in a periodically transmitted beacon message. The reserved SSID can indicate that the hybrid device 104 comprises temporarily enabled AP functionality, that the hybrid device 104 should be used as a "last-resort connection" to the communication network 100, and that detecting only the reserved SSID indicates that the client device 108 is in a coverage hole. As will be further described with reference to FIG. 5, if the client device 108 (e.g., the coverage hole detection unit 128) only receives a beacon message comprising the reserved SSID, it can be inferred that the client device 108 is in a coverage hole. The coverage hole detection unit 128 can (either directly or indirectly) notify the CAP 102 that the client device 108 is in a coverage hole. As will be further described in FIG. 6, based on coverage hole information received from the client device 108, the coverage hole detection unit 122 of the CAP 102 can enable AP functionality, determine whether the client device 108 is in a coverage hole, and alter the configuration of one or more hybrid devices 104 to eliminate the detected coverage hole and to provide good WLAN coverage to the client device 108.

Similarly as described for the link establishment unit 114, it is noted that the link establishment units 121 and 126 can each allow their respective network devices to establish a communication link with another suitable network device of the communication network 100. Although FIG. 1 describes the hybrid device 104 comprising a configuration unit 118 to enable/disable WLAN AP functionality of the hybrid device 104, embodiments are not so limited. In other embodiments, the hybrid device 104 may not comprise the configuration unit 118. Instead, functionality of the configuration unit 118 may be implemented as part of a WLAN module of the hybrid device 104 or as part of the coverage hole detection unit 114.

FIG. 2A is a flow diagram ("flow") 200 illustrating example operations for determining whether a client device is in a coverage hole. The flow begins at block 202.

At block 202, a first access point of a communication network receives a connection request message from a client device attempting to join the communication network. As will be further described below with reference to FIGS. 3 and 4, the link establishment unit 114 of the network device 104 can receive a connection request message from the client device 108. The connection request message can indicate that the client device 108 is attempting to join the communication network 100 by establishing a communication link with the network device 104. The flow continues at block 204.

At block 204, the first access point determines whether the client device can establish a communication link with a second access point of the communication network. As will be further described with reference to FIG. 4, the coverage hole detection unit 116 of the network device 104 can determine whether another access point (e.g., the network device 106) can detect and establish a communication link with the client device 108. This determination can allow the coverage hole detection unit 116 to infer whether the client device 108 is in a coverage hole of the communication network 100. If the client device can establish a communication link with a second access point, the flow continues at block 206. Otherwise, the flow continues at block 208.

At block 206, the first access point determines not to establish the communication link with the client device. As will be further described with reference to FIGS. 3 and 4, if the client device 108 can detect another access point 106, the coverage hole detection unit 116 can infer that the client device 108 is not in a coverage hole. Accordingly, the coverage hole detection unit 116 can determine that the link establishment unit 114 should not establish a communication link between the network device 104 and the client device 108. From block 206, the flow ends.

At block 208, the first access point establishes the communication link with the client device. As will be further described with reference to FIGS. 2B-4, if the client device 108 cannot detect and establish a communication link with another access point 106, the coverage hole detection unit 116 can infer that the client device 108 is in a coverage hole. Accordingly, the coverage hole detection unit 116 can determine that the link establishment unit 114 should establish a communication link between the network device 104 and the client device 108. From block 208, the flow ends.

FIG. 2B is a flow diagram 250 illustrating example operations of one embodiment for selectively establishing a communication link with a client device. The flow 250 begins at block 252.

At block 252, a network device of a communication network transmits a beacon message with limited communication capabilities. With reference to the example of FIG. 1, the link establishment unit 114 can transmit a beacon message indicating that the network device 104 comprises an access point with inferior communication capabilities. Instead of disabling the AP functionality of the network device 104, the network device 104 may be configured to present itself as an access point with limited or inferior communication capabilities as compared to other preferred access points (e.g., the network device 106) of the communication network 100. For example, if an existing access point (e.g., the network device 106) comprises an 802.11n access point, the link establishment unit 114 can indicate that the network device 104 comprises an 802.11b access point (irrespective of its actual communication capabilities). As another example, the link establishment unit 114 can present the network device 104 as an inferior access point by indicating that the network device 104 does not operate on a primary communication channel, has high traffic load, has low backhaul bandwidth, etc. The flow continues at block 254.

At block 254, it is determined whether a connection request message is received from a client device attempting to join the communication network. For example, the link establishment unit 114 can determine whether a connection request message was received from a client device 108 attempting to join the communication network 100. If the network device 104 received a connection request message, the flow continues at block 256. Otherwise, the flow loops back to block 254, where the network device 104 continues to wait to receive a connection request message. It is noted that the link establishment unit 114 can continue to periodically (e.g., every predetermined beacon interval) transmit the beacon message as discussed above in block 252.

At block 256, the network device establishes a communication link with the client device. The flow 250 moves from block 254 to block 256 if the link establishment unit 114 receives a connection request message from the client device 108. If the client device 108 detects multiple access points in the communication network 100, the client device 108 typically selects the access point with preferred communication capabilities (e.g., a highest data rate, highest bandwidth, lowest attenuation level, highest signal strength, etc.). If the network device 104 receives the connection request message from the client device 108 after advertising inferior communication capabilities, the network device 104 can infer that the client device 108 is in a coverage hole and can only connect to the communication network 100 via the network device 104. Accordingly, the link establishment unit 114 can establish a communication link between the network device 104 and the client device 108. The network device 104 can also relay traffic for the client device 108 to the CAP 102, to other network devices 106, and/or across multiple network segments of the communication network 100. In some embodiments, the coverage hole detection unit 116 of the network device 104 may notify the CAP 102 that the client device 108 is in a coverage hole. In some embodiments, the network device 104 can also determine (e.g., from the client device 108) and provide a location of the client device 108 to the CAP 102. In some embodiments, the location of the client device 108 can be relative to the location of the network device 104. For example, the location of the client device 108 can be recorded in terms of a MAC address of the network device 104. In other embodiments, the client device 108 may provide its actual location to the network device 104. The CAP 102 can notify a user (or network administrator) of the location of a coverage hole (or region of poor performance/coverage) in the communication network 100. From block 256, the flow ends.

Figure 3:
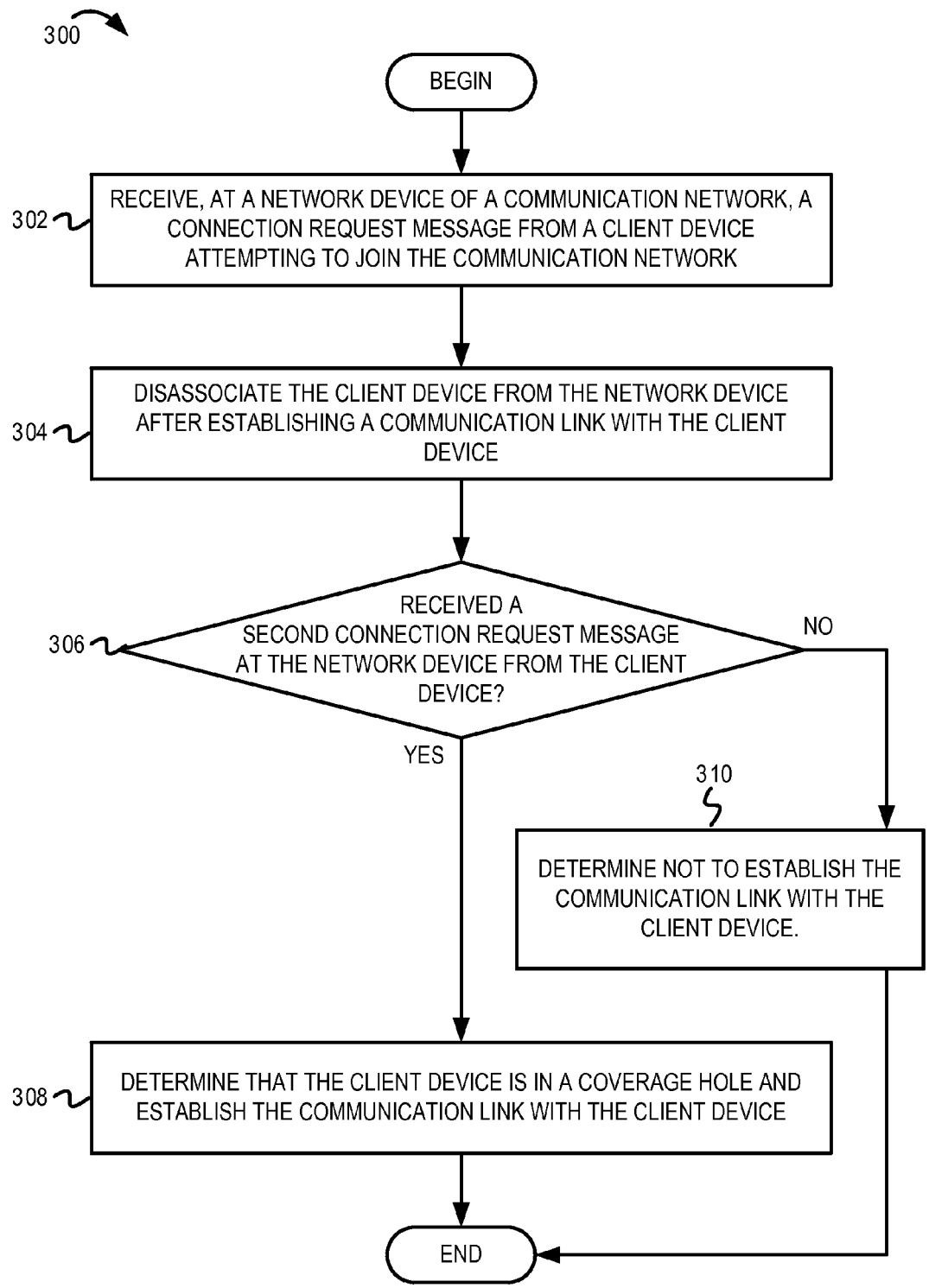
FIG. 3 is a flow diagram illustrating example operations of another embodiment for selectively establishing a communication link with a client device.

FIG. 3 is a flow diagram 300 illustrating example operations of another embodiment for selectively establishing a communication link with a client device. The flow 300 begins at block 302.

At block 302, a network device receives a connection request message from a client device attempting to join a communication network. With reference to the example of FIG. 1, the link establishment unit 114 of the network device 104 can receive a connection request message from the link establishment unit 126 of the client device 108. The link establishment unit 114 can periodically transmit a beacon message to indicate/advertise the presence of the network device 104 in the communication network 100. The client device 108 can detect a beacon message and can transmit a connection request message to establish a communication link with the network device 104 and to join the communication network 100. The flow continues at block 304.

At block 304, after establishing a communication link with the client device, the network device disassociates the client device. For example, the coverage hole detection unit 116 can prompt the link establishment unit 114 to disassociate/deauthenticate the client device 108 from the network device 104, thus severing the communication link between the client device 108 and the network device 104. In doing so, the coverage hole detection unit 116 can attempt to evaluate whether the client device 108 is in a coverage hole and whether the network device 104 should communicate with and relay traffic for the client device 108. The flow continues at block 306.

At block 306, it is determined whether a second connection request message is received from the client device. For example, the link establishment unit 114 can determine whether the client device 108 transmitted another connection request message to the network device 104. The coverage hole detection unit 116 can determine whether the client device 108 will attempt to connect to the communication network 100 via another access point or whether the client device 108 will continue to try to connect to the communication network 100 via the network device 104. If the client device 108 transmits another connection request message to the network device 104, the flow continues at block 308. Otherwise, the flow continues at block 310.

At block 308, if the network device receives a second connection request message from the client device, the network device infers that the client device is in a coverage hole and establishes the communication link with the client device. After disassociating the client device 108 from the network device 104, if the client device 108 attempts to reconnect with the network device 104 (e.g., by transmitting a second connection request message at block 306), the coverage hole detection unit 116 can infer that the client device 108 is in a coverage hole and can only connect to the communication network 100 via the network device 104. The link establishment unit 114 can establish a communication link between the network device 104 and the client device 108. The network device 104 can also relay traffic for the client device 108 to the CAP 102, to other network devices 106, and/or across multiple network segments of the communication network 100. In some embodiments, the coverage hole detection unit 116 of the network device 104 may notify the CAP 102 that the client device 108 is in a coverage hole. In some embodiments, the network device 104 can also determine and provide a location of the client device 108 to the CAP 102. In some embodiments, the location of the client device 108 can be relative to the location of the network device 104. For example, the location of the client device 108 can be recorded in terms of a MAC address of the network device 104. In other embodiments, the client device 108 may provide its actual location to the network device 104. The CAP 102 can notify a user (or network administrator) of the location of a coverage hole (or region of poor performance/coverage) in the communication network 100. From block 308, the flow ends.

At block 310, if the network device does not receive a second connection request message from the client device, the network device determines not to establish the communication link with the client device. In some embodiments, after disassociating the client device 110 from the network device 104, if the client device 110 does not attempt to reconnect with the network device 104 (e.g., by transmitting a second connection request message at block 306), the coverage hole detection unit 116 can infer that the client device 110 is not in a coverage hole. In some embodiments, after disassociating the client device 110 from the network device 104, if the client device 110 joins the communication network 100 via another access point (e.g., the network device 106), the coverage hole detection unit 116 can infer that the client device 110 is not in a coverage hole. The coverage hole detection unit 116 can determine that the link establishment unit should not to establish a communication link with the client device 110. From block 310, the flow ends.

Figure 4:
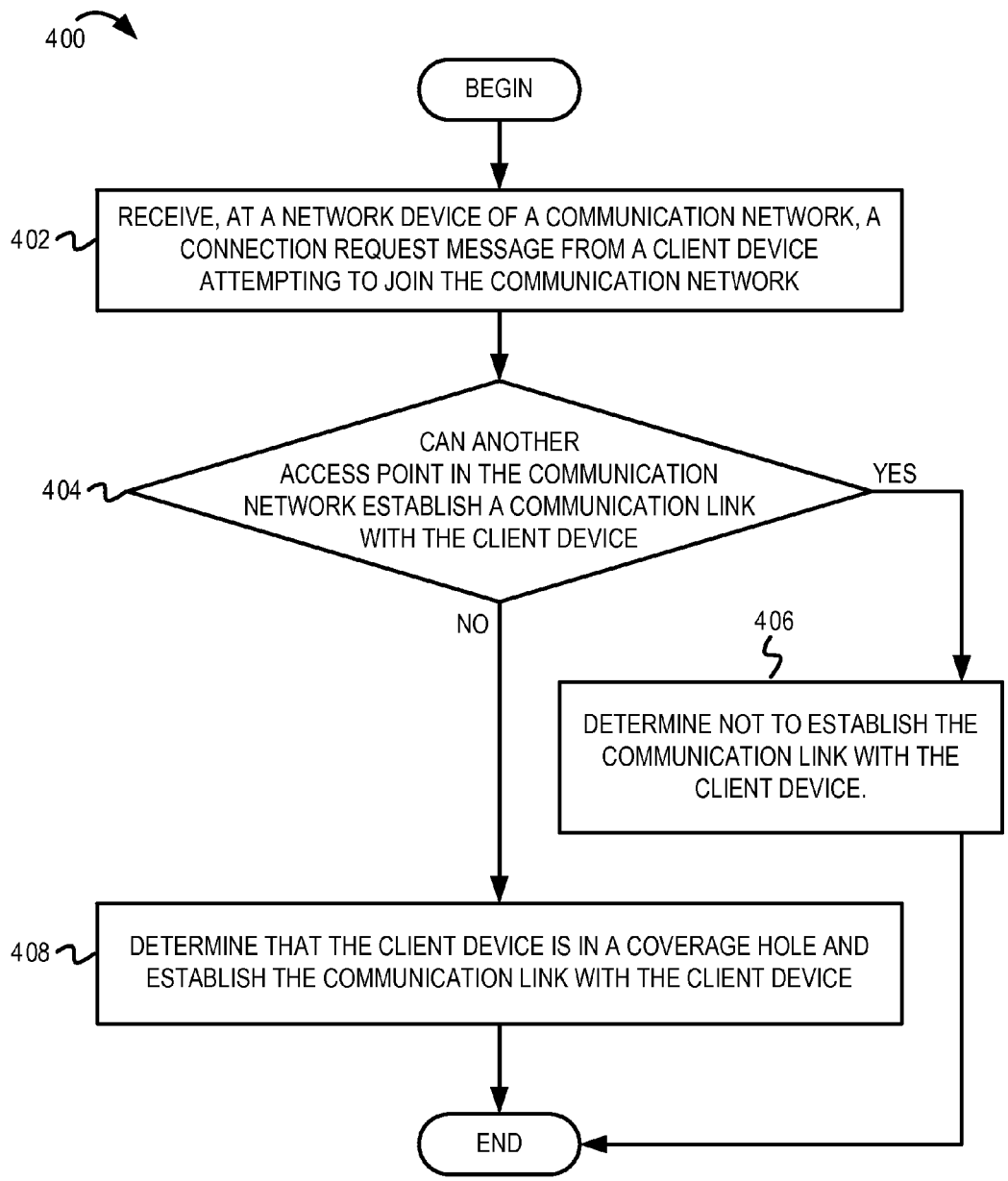
FIG. 4 is a flow diagram illustrating example operations of another embodiment for selectively establishing a communication link with a client device.

FIG. 4 is a flow diagram 400 illustrating example operations of another embodiment for selectively establishing a communication link with a client device. The flow 400 begins at block 402.

At block 402, a network device receives a connection request message from a client device attempting to join a communication network. With reference to the example of FIG. 1, the link establishment unit 114 of the network device 104 can receive a connection request message from the link establishment unit 126 of the client device 108. The link establishment unit 114 can periodically transmit a beacon message to indicate the presence of the network device 104 in the communication network 100. The client device 108 can detect a beacon message and can transmit a connection request message to establish a communication link with the network device 104 and to join the communication network 100. The flow continues at block 404.

At block 404, it is determined whether another access point in the communication network can establish a communication link with the client device. Before establishing the communication link with the client device 108, the coverage hole detection unit 116 of the network device 104 may ensure that the client device 108 is in a coverage hole and cannot join the communication network 100 without the network device 104. The coverage hole detection unit 116 can collaborate with other access points to determine whether another access point can detect and establish a communication link with the client device 108. In some embodiments, the coverage hole detection unit 116 can query other access points (e.g., the network device 106, the CAP 102, etc.) to determine whether another access point can detect and connect to the client device 108. As part of the query, the network device 104 can indicate identifying information (e.g., a network address, current communication channel, etc.) associated with the client device 108. The other access points can determine whether they can detect and establish a communication link with the client device 108. In some embodiments, the other access points can passively monitor traffic from the client device 108 to determine whether the client device 108 is "reachable." In another embodiment, the other access points can transmit forged messages to trigger a response from the client device 108 to determine whether the client device 108 is reachable. In accordance with WLAN communication protocols, the client device 108 may communicate with an access point 104 with which the client device 108 has associated. Typically, the client device 108 may not communicate with other access points 102 and 106, with which it is not associated. Thus, to prompt the client device 108 to respond to messages from the other access points 102 and 106, these access points can forge a message so that the message transmitted from the access point 106 appears to be a message from the associated access point 104. Depending on whether the client device 108 transmits an acknowledgement message to the forged messages and based on the signal strength of the acknowledgement messages, the other access points can each determine whether the client device 108 is reachable. If another access point can establish the communication link with the client device, the flow continues at block 406. Otherwise, the flow continues at block 408.

At block 406, if another access point can establish the communication link with the client device, the network device determines not to establish the communication link with the client device. For example, if the network device 106 can detect and establish a reliable communication link with the client device 110, the network device 104 can infer that the client device 110 is not in a coverage hole. In some embodiments, the network device 104 can determine not to establish a communication link with the client device 110 and can ignore or reject connection request messages received from the client device 110. In another embodiment, the network device 104 can force the client device 110 to connect to the other access point (e.g., the network device 106). For example, if the network device 104 supports a basic service set (BSS) transition feature described by the IEEE 802.11v communication protocols, the network device 104 (e.g., the link establishment unit 114 and/or the coverage hole detection unit 116) can request the client device 110 to connect to a different access point. The network device 104 may also identify the access point (e.g., by transmitting a network identifier, SSID, etc.) with which the client device 110 should establish the communication link. In another embodiment, the network device 104 can block subsequent messages received from (and destined for) the client device 110, so that the client device 110 cannot communicate with the network device 104 for a predetermined blocking time interval. The network device 104 may not attempt to block the client device 110 after the blocking time interval elapses. Alternately, the network device 104 can prematurely suspend the blocking time interval and may not attempt to block the client device 110, if the client device 110 connects to the communication network 100 via another access point 106. From block 406, the flow ends.

At block 408, if another access point cannot establish the communication link with the client device, the network device establishes the communication link with the client device. If another access point cannot detect (or establish a reliable communication link with) the client device 108, the coverage hole detection unit 116 can infer that the client device 108 is in a coverage hole and can only connect to the communication network 100 via the network device 104. Accordingly, the link establishment unit 114 can establish a communication link between the network device 104 and the client device 108. The network device 104 can also relay traffic for the client device 108 to the CAP 102, to other network devices 106, and/or across multiple network segments of the communication network 100. In some embodiments, the coverage hole detection unit 116 may notify the CAP 102 that the client device 108 is in a coverage hole. In some embodiments, the network device 104 can also determine and provide a location of the client device 108 to the CAP 102. In some embodiments, the location of the client device 108 can be relative to the location of the network device 104. For example, the location of the client device 108 can be recorded in terms of a MAC address of the network device 104. In other embodiments, the client device 108 may provide its actual location to the network device 104. The CAP 102 can notify a user (or network administrator) of the location of a coverage hole (or region of poor performance/coverage) in the communication network 100. From block 408, the flow ends.

Although FIGS. 3 and 4 describe the network device 104 querying other access points to determine whether the other access points can detect the client device 108, embodiments are not so limited. In other embodiments (e.g., if the client device 108 implements IEEE 802.11k communication protocols), the network device 104 can directly query the client device 108 regarding the client device's connectivity to other access points in the communication network 100. The client device 108 can use a "beacon report" feature of the IEEE 802.11k communication protocol to indicate whether the client device 108 can reliably detect another access point in the communication network 100.

In some embodiments, the network device 104 can employ a combination of the techniques described in FIGS. 2B-4 to determine whether to establish the communication link with a client device. In some embodiments, the link establishment unit 114 of the network device 104 may transmit a beacon message that does not comprise an SSID of the communication network 100. With reference to FIG. 1, when the network device 104 receives a connection request message from the client device 110, the network device 104 may not respond to the connection request message for at least a predetermined delay time interval. During the predetermined delay time interval, the network device 104 can determine whether the client device 110 has joined the basic service set (BSS) of another access point. The network device 104 can determine whether the client device 110 has joined another BSS by exchanging signaling messages with the other access points (e.g., the CAP 102, the network device 106) of the communication network, reusing topology messages described in IEEE Std. 1905.1, sniffing packets transmitted in the communication network 100, and other suitable techniques. During the predetermined delay time interval, the network device 104 can also estimate the link quality between the other access points and the client device 110. For example, the network device 104 can determine that the network device 106 can provide a reliable communication link to the client device 110 (e.g., a communication link with a high signal strength, low attenuation, low packet rate, high data rate, etc.). During the predetermined delay time interval, if the network device 104 determines that the client device 110 has joined the BSS of another access point and/or that another access point can provide a reliable communication link to the client device 110, the network device 104 may not respond to the connection request message received from the client device 110. Instead, the network device 104 may allow the network device 106 to establish the communication link with the client device 110.

However, if the network device 104 receives a connection request message from the client device 108, the network device 104 can attempt to locate another access point that can establish a communication link with the client device 108 during the predetermined delay time interval. After the predetermined delay time interval elapses, the network device 104 may determine that no other access point can provide a reliable communication link to the client device 108. Accordingly, the network device 104 can transmit a response to the connection request messages, establish a communication link with the client device 108, and enable the client device 108 to join the BSS of the network device 104. In other words, the network device 104 may selectively enable its AP functionality to a client device depending on whether the network device 104 can locate an alternate access point for the client device.

Figure 5:
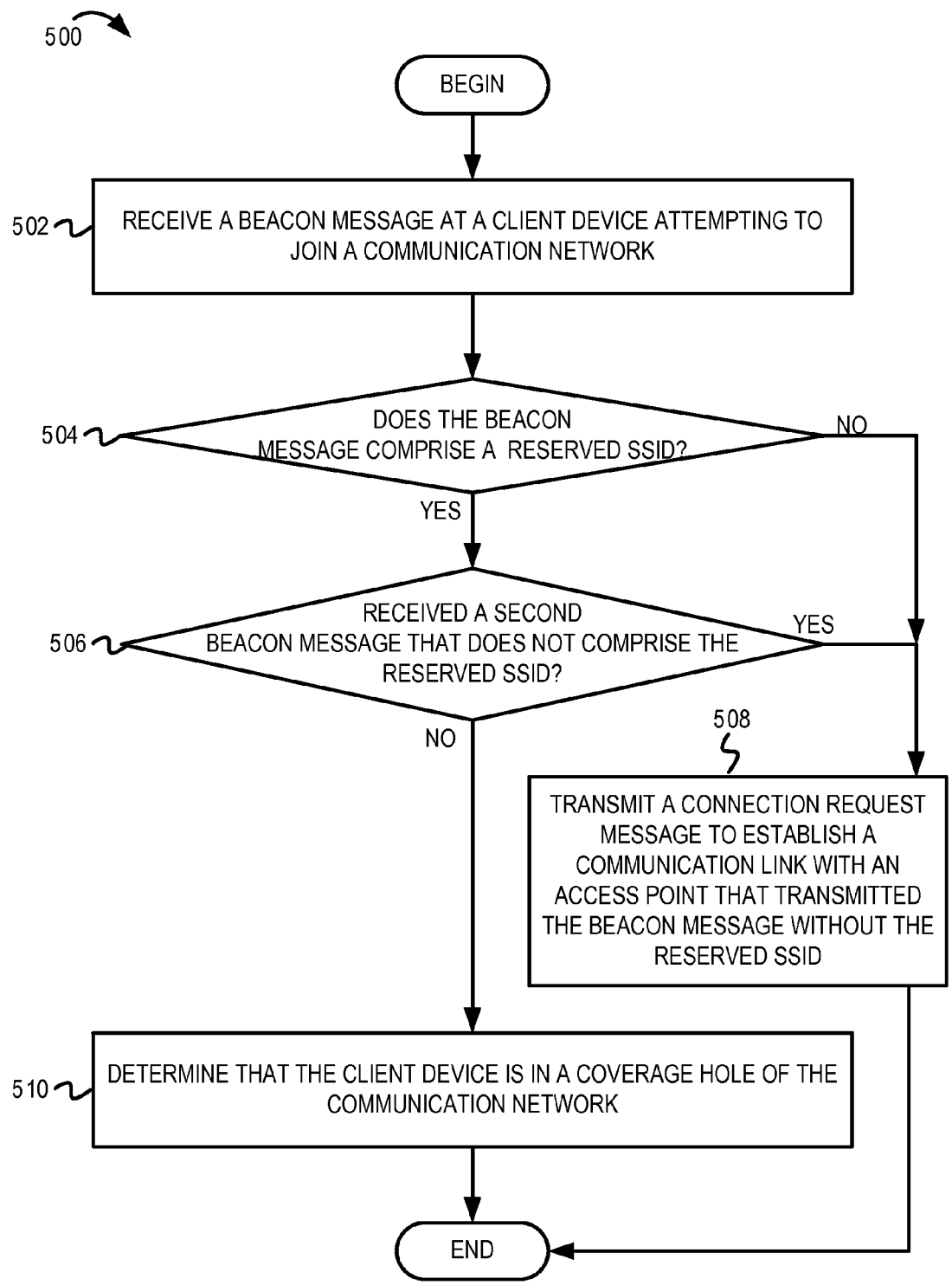
FIG. 5 is a flow diagram illustrating example operations of a client device for detecting a coverage hole in a communication network.

FIG. 5 is a flow diagram illustrating example operations 500 of a client device for detecting a coverage hole in a communication network. The flow begins at block 502.

At block 502, a client device attempting to join a communication network receives a beacon message from an access point of the communication network. In some embodiments, as depicted with reference to FIG. 1, the link establishment unit 124 of the client device 108 can receive the beacon message from an access point module of the network device 104. The flow continues at block 504.

At block 504, it is determined whether the beacon message comprises a reserved SSID. In some embodiments, instead of disabling the AP functionality of the network device 104, the link establishment unit 114 of the network device 104 can be configured to periodically broadcast a beacon message comprising a reserved SSID. In other embodiments, the network device 104 can temporarily enable AP functionality to broadcast the beacon message comprising the reserved SSID. The reserved SSID can be predetermined and can indicate that the network device 104 is a "last-resort connection." In other words, the reserved SSID can indicate that the network device 104 will establish a communication link with (and relay traffic for) a client device only if the client device is in a coverage hole and if the client device cannot detect another access point with a regular (non-reserved) SSID. It is noted that the reserved SSID can indicate that the network device 104 is a temporary access point. The reserved SSID can also indicate that the network device 104 has less preferred communication capabilities as compared to other access points in the communication network. The network router 106 (and other enabled access points) can be configured to use another suitable SSID (e.g., a "non-reserved SSID") to indicate its presence in the communication network 100. By determining whether the beacon message comprises the reserved SSID, the coverage hole detection unit 128 of the client device 108 can determine whether the client device 108 is in a coverage hole. If the beacon message comprises the reserved SSID, the flow continues at block 506. Otherwise, the flow continues at block 508.

At block 506, it is determined whether a second beacon message that does not comprise the reserved SSID and that was transmitted by a second access point in the communication network was received at the client device. The flow 500 moves from block 504 to block 506 if the beacon message received at block 504 comprises the reserved SSID. In response to detecting the reserved SSID, the coverage hole detection unit 128 can determine whether the client device 108 has also detected other access points (within the communication network 100) with a regular (non-reserved) SSID. With reference to the above example, the coverage hole detection unit 128 can determine whether the client device 108 received another beacon message with the non-reserved SSID from another access point within the communication network 100. If the client device 108 has not detected any other access points in the communication network 100 the coverage hole detection unit 128 can infer that the client device 108 is in a coverage hole. If the client device 108 received another beacon message that does not comprise the reserved SSID, the flow continues at block 508. If the client device 108 did not receive another beacon message that does not comprise the reserved SSID, the flow continues at block 510.

At block 508, the client device transmits a connection request message to establish a communication link with an access point that transmitted the beacon message without the reserved SSID. The flow 500 moves from block 504 to block 508 if the beacon message received from the network device 106 does not comprise the reserved SSID. The flow 500 also moves from block 506 to block 508 if in addition to the beacon message that comprises the reserved SSID, the client device 108 also received another beacon message without the reserved SSID. In other words, if client device 108 receives at least one beacon message that does not comprise the reserved SSID, the coverage hole detection unit 128 can infer that the client device 108 is not in a coverage hole. For example, the client device 108 can determine that the network device 106 transmitted the beacon message with a regular non-reserved SSID. The link establishment unit 124 of the client device 108 can transmit a connection request message to the network device 106 and can attempt to establish a communication link with the network device 106. From block 508, the flow ends.

At block 510, the client device determines that it is in a coverage hole. In some embodiments, the coverage hole detection unit 128 can record a location of the client device 108 in terms of a device identifier of the network device 104 that transmitted the reserved SSID. For example, the coverage hole detection unit 128 can record the location of the client device 108 by recording a MAC address of the network device 104. If the client device 108 received a beacon message (with a regular non-reserved SSID) from another access point with a weak signal strength, the coverage hole detection unit 128 can record the signal strength of the received beacon message and an identifier of the access point that transmitted the beacon message (with a regular non-reserved SSID). In some embodiments, if the client device 108 is in a coverage hole, the client device 108 may not attempt to establish a communication link with the network device 104 using the reserved SSID. The coverage hole detection unit 128 can transmit the recorded information ("coverage hole information") to the CAP 102 when the client device 108 can detect the CAP 102. Alternately, the coverage hole detection unit 128 can transmit the coverage hole information to the CAP 102 using out-of-band communication techniques (e.g., using a cellular network, a powerline network, etc.). For example, if the communication network 100 is formed by an interconnection of a WLAN segment and a powerline network segment, the client device can transmit the coverage hole information to the CAP 102 via the powerline network segment. As another example, if the CAP 102 and the client device 108 have a cellular network connection or an Internet connection, the client device 108 can transmit the coverage hole information to the CAP 102 via the cellular network or the Internet.

In another embodiment, if the client device 108 is in a coverage hole, the client device 108 may temporarily establish a communication link with the network device 104 using the reserved SSID. The coverage hole detection unit 128 can notify the network device 104 that the client device 108 is in a coverage hole and can transmit the coverage hole information to the network device 104. The network device 104, in turn, can forward the coverage hole information to the CAP 102 (e.g., via the WLAN or other suitable communication technologies). For example, if the communication network 100 is formed by an interconnection of a WLAN segment and a powerline network segment, the network device 104 can receive the coverage hole information via the WLAN segment and forward the coverage hole information to the CAP 102 via the powerline network segment.

In another embodiment, the client device 108 can notify the network device 104 that the client device 108 is in a coverage hole and that the client device 108 can only detect the network device 104. Accordingly, the configuration unit 118 of the network device 104 can automatically (e.g., without CAP intervention or user intervention) switch its WLAN configuration to enable its WLAN AP module (or to configure its WLAN radio transceiver as a WLAN access point), to operate as a network router of the communication network 100, to use the non-reserved SSID of the communication network 100, and to establish a communication link with the client device 108. In another embodiment, the client device 108 can notify a user (or network administrator) that the client device 108 is in a coverage hole and can transmit the coverage hole information to the user. From block 510, the flow ends.

In response to receiving a notification of the coverage hole ("coverage hole notification") from the client device 108, the CAP 102 can transmit a configuration message to the network device 104 to request the network device 104 to enable its WLAN AP functionality, to operate as a network router, and to establish a communication link with the client device 108. The CAP 102 may also request the network device 104 to stop using the reserved SSID and to instead use the regular non-reserved SSID in subsequently transmitted beacon messages. In response to receiving the configuration message from the CAP 102, the network device 104 (e.g., the configuration unit 118) can disable the use of the reserved SSID and can operate as a network router (or network range extender) in the communication network 100. The network device 104 can transmit subsequent beacon messages using the regular non-reserved SSID. The client device 108 can detect the beacon message from the network device 104 and transmit a connection request message to the network device 104. In some embodiments, the CAP 102 (or the client device 108) may notify a network administrator that the client device 108 is in a coverage hole and can detect the network device 104 (that is configured to broadcast the reserved SSID). The network administrator can reconfigure the network device 104 to operate as a network router, to stop using the reserved SSID, and to use the regular non-reserved SSID in subsequently transmitted beacon messages.

Figure 6:
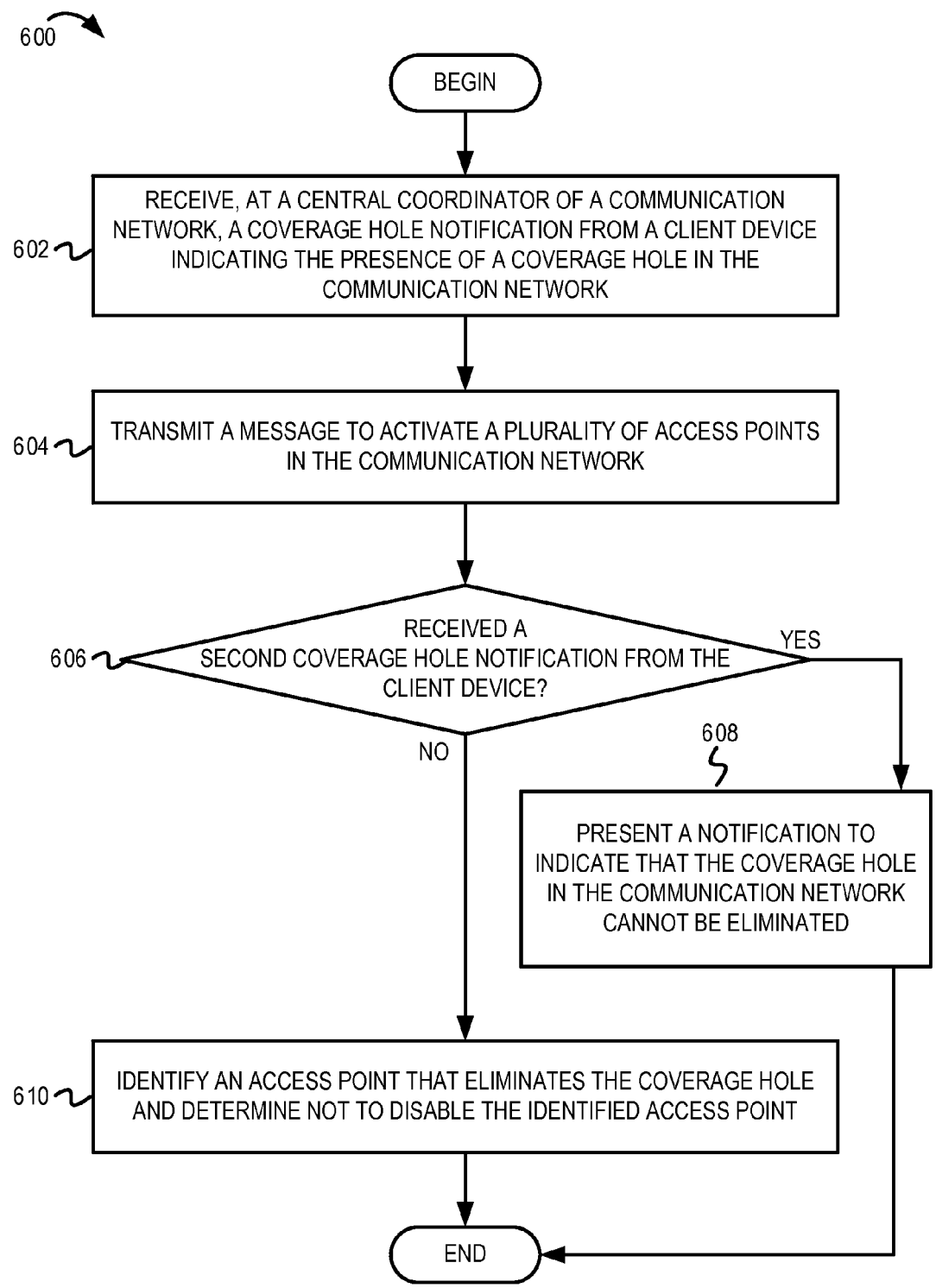
FIG. 6 is a flow diagram illustrating example operations of a central coordinator minimizing coverage holes in a communication network.

FIG. 6 is a flow diagram 600 illustrating example operations of a central coordinator minimizing coverage holes in a communication network. The flow 600 begins at block 602.

At block 602, a central coordinator of a communication network receives a coverage hole notification from a client device indicating the presence of a coverage hole. With reference to the example of FIG. 1, the CAP 102 can execute the operations described below in FIG. 6. For example, if the client device 108 (e.g., the link establishment unit 126) is unable to detect a beacon message from any access points in the communication network 100, the coverage hole detection unit 128 can infer that the client device 108 is in a coverage hole. As another example, if the client device 108 receives a beacon message that are not in accordance with preferred performance measurements (e.g., if the received beacon message has a low signal strength, a high attenuation level, high error rate, low data rate, etc.), the coverage hole detection unit 128 can infer that the client device 108 is in a coverage hole. In response to detecting a coverage hole, the coverage hole detection unit 128 of the client device 108 can transmit a coverage hole notification to the CAP 102 (e.g., the coverage hole detection unit 122) of the communication unit 100. As discussed above with reference to block 510 of FIG. 5, the coverage hole notification can include a location of the client device 108 at which the coverage hole was detected, access points detected (if any) by the client device 108, performance measurements (e.g., signal strength, attenuation level, error rate, etc.) associated with the detected access points (if any), and other suitable information.

In some embodiments, the CAP 102 can receive the coverage hole notification from the client device 108 using out-of-band communication techniques (e.g., using a previously established cellular communication link, PLC link, etc.). In some embodiments, if the client device 108 and the CAP 102 (or another network device 104 or 106) have Internet connectivity, then the CAP 102 can receive the coverage hole notification from the client device 108 via the Internet. For example, the client device 108 may connect to the Internet via a PLC link and can transmit the coverage hole notification (for the WLAN) over the PLC Internet link. In other embodiments, the CAP 102 can receive the coverage hole notification when the client device 108 is within communication range of the CAP 102 (e.g., when the client device 108 can detect the CAP 102. In other embodiments, the CAP 102 can indirectly receive the coverage hole notification from the client device 108 via another network device 106 of the communication network 100. The flow continues at block 604.

At block 604, the central coordinator transmits a message to activate a plurality of access points in the communication network. As discussed above, AP functionality may be disabled at a plurality of network devices in the communication network 100. For example, the network device 104 may disable its access point module (or may configure its WLAN radio transceiver as a WLAN client device) and may not be configured to establish a communication link with other client devices. As another example, if the network device 104 is a WLAN access point, the WLAN access point may be disabled. In response to receiving the coverage hole notification, the CAP 102 can transmit a message to cause all the AP-capable network devices to enable their respective AP functionality. In this example, the configuration unit 118 can alter the WLAN configuration of the network device 104 so that the network device 104 temporarily enables its AP functionality and temporarily operates as a WLAN access point. The flow continues at block 606.

At block 606, it is determined whether a second coverage hole notification is received from the client device. As discussed above in block 604, after the CAP 102 transmits the message to force all AP-capable network devices to enable their respective AP functionality, the AP-capable network devices 104 and 106 can each transmit a beacon message. The CAP 102 (e.g., the coverage hole detection unit 122) can wait for a second coverage hole notification from the client device 108 to determine whether the client device 108 is still in the coverage hole after all the access points in the communication network 100 have been activated/enabled. If the CAP 102 receives the second coverage hole notification from the client device 108, the CAP 102 can infer that the client device 108 is still in the coverage hole and the flow continues at block 608. Otherwise, if the CAP 102 does not receive the second coverage hole notification from the client device 108, the CAP 102 can infer that the client device 108 is no longer in the coverage hole and the flow continues at block 610.

At block 608, a notification is presented to indicate that the coverage hole in the communication network cannot be eliminated. The flow 600 moves from block 606 to block 608 if the client device 108 is in a coverage hole after all the access points in the communication network 100 are activated/enabled. The CAP 102 can present this notification on a display device of the CAP 102, the client device 108, and/or another suitable electronic device of the user (e.g., the CAP 102 can transmit an short messaging server (SMS) message to the user's mobile phone). As part of the notification, the CAP 102 can indicate the location of the coverage hole and can suggest potential solutions for eliminating the coverage hole (e.g., moving an access point closer to the location of the coverage hole, installing a new access point in the communication network 100, etc.). If the client device 108 is still in the coverage hole and cannot join the communication network 100, the CAP 102 can transmit a suitable message to indicate that an access point or an AP-capable network device should disable its AP functionality. For example, the CAP 102 can transmit this message to those AP-capable network devices 104 that temporarily enabled their AP functionality. From block 608, the flow ends.

At block 610, the central coordinator identifies the access point that eliminates the coverage hole and determines not to disable the identified access point. In some embodiments, the CAP 102 can receive a notification from the client device 108 indicating that the client device 108 detected an access point (e.g., the network device 104) after all the access points in the communication network 100 were activated/enabled. This notification can include an identifier (e.g., device identifier, SSID, etc.) of the network device 104 and performance measurements (e.g., signal strength) associated with the network device 104. In transmitting the notification, the client device 108 can indicate that it can join the communication network 100 via the network device 104. The CAP 102 can request the network device 104 (that temporarily enabled its AP functionality at block 606) to not disable its AP functionality and to operate as a network router (or a network range extender) of the communication network 100. The CAP 102 can transmit a suitable message to the other network devices that had temporarily enabled their AP functionality to cause these network devices to disable their AP functionality. For example, the CAP 102 can transmit the message to the network 104 to cause the network device 104 to disable its AP functionality. From block 610, the flow ends.

In some embodiments, after causing the network devices to temporarily enable their (previously disabled) AP functionality, various techniques can be employed to ensure that client devices (e.g., the client device 110) that are already connected to the communication network 100 do not switch to the network devices with temporarily enabled AP functionality. For example, after receiving the message from the CAP 102 to enable the AP functionality, the network device 104 can execute operations described above in FIGS. 2B-5 to indicate that the network device 104 is a temporary access point or an inferior access point. For example, after temporarily enabling AP functionality, the network device 104 can broadcast a beacon message including inferior communication capabilities, as described above in FIG. 2B. As another example, after temporarily enabling AP functionality, the network device 104 can broadcast a beacon message including a reserved SSID, as described above in FIG. 5.

Although FIG. 6 describes the CAP 102 operating as the central coordinator of the communication network 100, embodiments are not so limited. In another embodiment, the central coordinator may be another suitable network device of the communication network 100. In yet another embodiment, the central coordinator may be a network device that is not part of the communication network 100. For example, functionality of the central coordinator (described in FIG. 6) may be implemented on a base station of a cellular communication network or another network device with cellular communication capabilities. The client device 108 and the AP-capable network devices of the communication network 100 may each have cellular communication capabilities. If the client device 108 cannot detect any AP-capable network devices, the client device 108 can transmit a coverage hole notification to the base station via the cellular communication network. The base station can use the cellular communication network to prompt the AP-capable network devices of the communication network 100 to enable their AP functionality. After the client device 108 detects the AP-capable network device 104, the base station can use the cellular communication network to notify the AP-capable network device 104 to not disable the AP functionality. It is noted that the central coordinator can use other suitable communication technologies and protocols to communicate with the client device 108 and the network devices of the communication network 100, without joining the communication network 100.

It should be understood that FIGS. 1-6 are examples meant to aid in understanding embodiments and should not be used to limit embodiments or limit scope of the claims. Embodiments may comprise additional components, different components, and/or may perform additional operations, fewer operations, operations in a different order, operations in parallel, and some operations differently. Although FIGS. 5 and 6 describe the coverage hole detection unit 128 of the client device 108 transmitting a coverage hole notification to the CAP 102, embodiments are not so limited. In other embodiments, the client device 108 can transmit the coverage hole notification to any suitable network device in the communication network 100. For example, if the client device 108 does not detect any WLAN access points, the client device 108 may transmit the coverage hole notification to a PLC-capable hybrid device via a powerline network segment of the communication network 100. The PLC-capable hybrid device can then forward the coverage hole notification to the CAP 102 via a powerline network, a WLAN, or other suitable communication network. It is further noted that although examples describe a hybrid device executing the coverage hole detection operations (described above in FIGS. 1-6), embodiments are not so limited. In other embodiments, other suitable network devices may execute the coverage hole detection operations described herein. Examples of other network devices can include a dedicated WLAN device, an electronic device (e.g., a WLAN to Ethernet adapter, a cable television set-top box, a WLAN-enabled television, a computer, etc.) with WLAN access point and WLAN client device functionality.

Although FIG. 1 depicts the client device 108 comprising coverage hole detection functionality, embodiments are not so limited. In some embodiments, the client device 108 may not comprise functionality for determining whether it is in a coverage hole. For example, as described with reference to FIGS. 2A-4, the network device 104 may attempt to detect and minimize coverage holes without assistance from the client device 108.

Although FIG. 1 describes the hybrid device 104 comprising a configuration unit 118 to enable/disable WLAN AP functionality of the hybrid device 104, embodiments are not so limited. In other embodiments, the hybrid device 104 may not comprise the configuration unit 118. Instead, the CAP 102 (or the client device 108) can directly provide a control signal to a WLAN module of the hybrid device 104 to enable or disable AP functionality of the hybrid device 104. In another embodiment, a non-hybrid device (e.g., a standalone or dedicated WLAN access point) may not comprise a configuration unit 118. Instead, the CAP 102 (or the client device 108) can directly provide a control signal can be provided to enable or disable the dedicated WLAN access point.

Although not described with reference to FIGS. 5 and 6, in some embodiments, the client device 108 can execute a coverage detection application ("app") that detects the signal strength associated with access points in the communication network and estimates the location of a coverage hole. In one example, the coverage detection application can be downloaded and executed on a smartphone, a tablet computer, or another suitable smart device. Coverage hole may be detected at locations where access points broadcasting the reserved SSID provide good WLAN coverage but access points broadcasting a regular non-reserved SSID do not provide good WLAN coverage. The coverage detection application may also be configured to record the location of the coverage hole, signal strength information, device identifiers of detected access points, etc. and provide this information to the CAP (e.g., when the client device 108 can detect the CAP 102 or using out-of-band communication techniques). As discussed above, the CAP 102 can alter the configuration of and enable one or more access points in the communication network 100 to minimize/eliminate coverage holes and to provide good WLAN coverage to the client device 108. In some embodiments, the coverage hole detection unit 128 of the client device 108 can be implemented as part of the coverage detection application.

In some embodiments, the client device 108 may identify a location at which the user does not need WLAN coverage (e.g., outside the user's home) as a coverage hole. In some embodiments, the coverage hole detection unit 128 can be configured to prompt the user to indicate whether WLAN coverage is needed. For example, if the coverage hole detection unit 128 does not detect any beacon messages, the coverage hole detection unit 128 can present a message prompting the user to indicate whether he/she requires good WLAN coverage. As another example, if the coverage hole detection unit 128 detects a beacon message with the reserved SSID, the coverage hole detection unit 128 can present a message prompting the user to indicate whether he/she requires good WLAN coverage. If the user requires WLAN coverage, the coverage hole detection unit 128 can transmit a coverage hole notification including coverage hole information to the CAP as described above in FIG. 5. In other embodiments, the coverage hole detection unit 128 can infer whether the user requires WLAN coverage by monitoring whether the user is actively using the communication capabilities of the client device 108 (e.g., whether the user is attempting to transmit information) and the number of failed transmission attempts at the current location. If the number of failed transmission attempts at the current location exceeds a threshold, the coverage hole detection unit 128 can infer that the client device 108 is in a coverage hole and that the user requires WLAN coverage.

In some embodiments, the coverage hole detection unit 128 of the client device 108 can allow the user to control when to transmit the coverage hole notification to the CAP 102 (or another network device of the communication network 100). For example, if the user requires WLAN coverage and cannot detect any WLAN access points, the user may press a button (or another suitable virtual or physical triggering device) on the client device 108 (e.g., a smartphone) to initiate coverage hole detection operations (described above in FIG. 5). In some embodiments, the coverage hole detection unit 128 can suggest (to the user) when to transmit the coverage hole notification. For example, if the client device 108 detects the communication network 100 (e.g., based on location information, detection of network devices in the communication network 100, etc.), the client device 108 can indicate that WLAN coverage is potentially available and can prompt the user to indicate whether coverage hole detection operations should be initiated.

In some embodiments, if the client device 108 supports enhanced MAC features (e.g., IEEE 802.11k communication protocols, IEEE Std. 1905.1, etc.), the client device 108 can leverage these protocols to determine and indicate whether the client device 108 is in a coverage hole. For example, the coverage hole detection unit 128 can use a "beacon report" feature described in the IEEE 802.11k communication protocol to identify the locations at which only the access points broadcasting the reserved SSID provide good WLAN coverage. In other words, the coverage hole detection unit 128 can use the "beacon report" feature to identify the locations at which only beacon messages comprising the reserved SSID are received with high signal strength. The client device 108 can transmit the beacon report to network devices 102, 104 or 106 using IEEE Std. 1905.1 communication protocols, using a special message type (e.g., a vendor specific information element (IE)), reusing an existing message type (e.g., a topology response message), or another suitable mechanism. For example, if a topology response message is reused, the network devices 102, 104, or 106 can read a device information type field in the message and determine that the client device 108 transmitted the topology response message. The client device 108 can report a list of detected access points and a link quality associated with each of the detected access points. The CAP 102 can use this information to determine whether to enable the AP functionality of the network device 104, cause the network device 104 to stop using the reserved SSID, etc.

As described above with references to FIGS. 5 and 6, in some embodiments, the client device 108 (e.g., the coverage hole detection unit 128) can use out-of-band communication networks (e.g., cellular networks, powerline networks, and other suitable communication networks different from the network segment on which the client device 108 is attempting to establish the communication link) to notify the CAP 102 (or another network device 104 or 106) that the client device 108 is in a coverage hole. In some embodiments, the client device 108 may already be connected to the communication network 100 via another communication protocol (e.g., via a cellular network, powerline network, Ethernet, TR-069, etc.). In this embodiment, the client device 108 can leverage this alternate connection to notify the CAP 102 that the client device 108 is in a coverage hole (for the WLAN segment of the communication network 100). In other embodiments, however, the client device 108 may not be connected to the communication network 100 via another communication protocol (or may not support another communication protocol). In this embodiment, the client device 108 can determine a public internet protocol (IP) address of a network gateway of the communication network 100 and a port on which a network device (of the communication network 100) is listening for incoming messages. In one example, if the CAP 102 is the network gateway, and if the communication network 100 is behind a network address translator (NAT), the public IP address can be determined using the Session Traversal Utilities for NAT (STUN) protocol. A network device 102, 104, or 106 can use the STUN protocol to find a port associated with the public IP address. The client device 108 can determine the public IP address and the corresponding port (e.g., from the Internet, from the network device 106, etc.), via which the client device 108 can transmit the coverage hole notification. In some embodiments, if the NAT is symmetric, the public IP address and the corresponding port can be determined using a Traversal Using Relays around NAT (TURN) protocol. In some embodiments, if the public IP address of the network gateway is dynamic, dynamic domain name server (DNS) protocols can be used to determine the current public IP address.

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
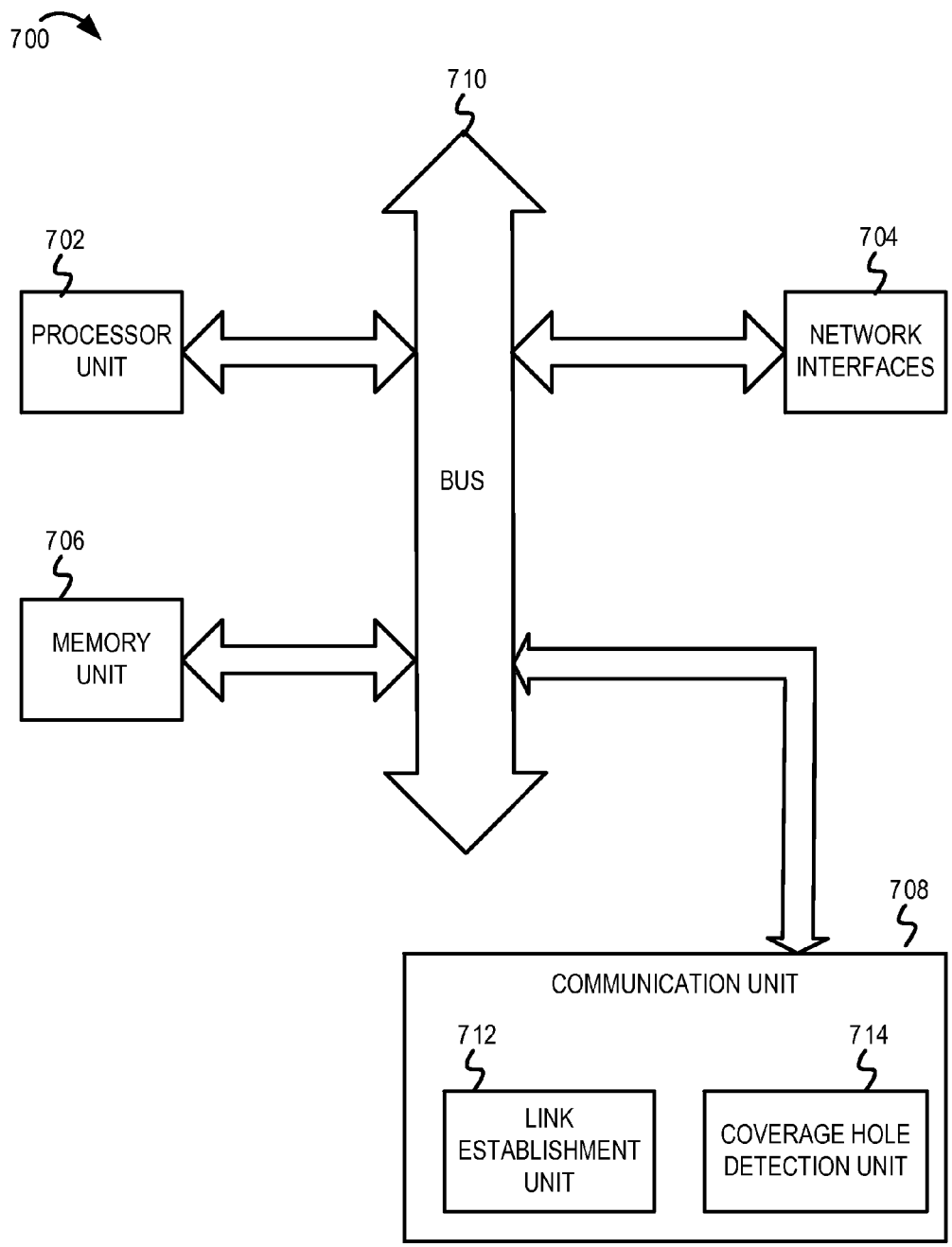
FIG. 7 is a block diagram of one embodiment of an electronic device including a mechanism for minimizing coverage holes in a communication network.

FIG. 7 is a block diagram of one embodiment of an electronic device 700 including a mechanism for minimizing coverage holes in a communication network. In some implementations, the electronic device 700 may be one of a desktop computer, laptop computer, a tablet computer, a mobile phone, a smart appliance, a powerline communication device, a gaming console, a network bridging device, an access point, or other electronic system comprising a communication unit configured to communicate across one or more communication networks. The electronic device 700 includes a processor unit 702 (possibly including multiple processors, multiple cores, multiple nodes, and/or implementing multi-threading, etc.). The electronic device 700 includes a memory unit 706. The memory unit 706 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 700 also includes a bus 710 (e.g., PCI, ISA, PCI-Express, HyperTransport®, InfiniBand®, NuBus, AHB, AXI, etc.), and network interfaces 704 that include at least one of a wireless network interface (e.g., a WLAN interface, a Bluetooth® interface, a WiMAX interface, a ZigBee® interface, a Wireless USB interface, etc.) and a wired network interface (e.g., a PLC interface, an Ethernet interface, etc.). In some implementations, the electronic device 700 can comprise a plurality of network interfaces—each of which couples the electronic device 700 to a different communication network. For example, the electronic device 700 can comprise a PLC interface, an Ethernet interface, and a WLAN interface that couple the electronic device 700 with a powerline communication network, an Ethernet, and a wireless local area network respectively. Furthermore, in some embodiments, the electronic device 700 can execute an IEEE Std. 1905.1 protocol for implementing hybrid communication functionality.

The electronic device 700 also includes a communication unit 708. The communication unit 708 comprises a link establishment unit 712 and a coverage hole detection unit 714. In some embodiments, the electronic device 700 can be a network device comprising AP functionality. As described above in FIGS. 1-4, the coverage hole detection unit 714 can determine whether a client device is in a coverage hole. The link establishment unit 712 can selectively establish a communication link with the client device depending on whether the client device is in a coverage hole. In another embodiment, the electronic device 700 can be a client device attempting to join a communication network. As described above in FIG. 5, the coverage hole detection unit 714 can determine whether the electronic device 700 is in a coverage hole. The coverage hole detection unit 714 can notify a central coordinator (or another network device) of the communication network if the electronic device 700 is in a coverage hole. In another embodiment, the electronic device 700 can be a central coordinator of the communication network. As described above with reference to FIG. 6, the coverage hole detection unit 714 can receive a coverage hole notification indicating that a client device is in a coverage hole. The coverage hole detection unit 714 can (in conjunction with the client device) identify an AP-capable network device that can eliminate the coverage hole and can cause the identified AP-capable network device to enable its AP functionality. In some embodiments, when the electronic device 700 is a network device comprising AP functionality, the electronic device 700 may comprise a configuration unit (not shown in FIG. 7) to enable/disable the AP functionality. For example, the configuration unit may receive a notification from the central coordinator to enable the AP functionality of the electronic device 700. The configuration unit may provide appropriate control messages to a WLAN module of the electronic device 700 to enable the AP functionality.

Any one of these functionalities may be partially (or entirely) implemented in hardware and/or on the processor unit 702. For example, the functionality may be implemented with an application specific integrated circuit, in logic implemented in the processor unit 702, in a co-processor on a peripheral device or card, etc. In some embodiments, the communication unit 708 can each be implemented on a system-on-a-chip (SoC), an application specific integrated circuit (ASIC), or another suitable integrated circuit to enable communications of the electronic device 700. In some embodiments, the communication unit 708 may comprise additional processors and memory, and may be implemented in one or more integrated circuits on one or more circuit boards of the electronic device 700. Further, realizations may include fewer or additional components not illustrated in FIG. 7 (e.g., video cards, audio cards, additional network interfaces, peripheral devices, etc.). For example, in addition to the processor unit 702 coupled with the bus 710, the communication unit 708 may comprise at least one additional processor unit. The processor unit 702, the memory unit 706, and the network interfaces 704 are coupled to the bus 710. Although illustrated as being coupled to the bus 710, the memory unit 706 may be coupled to the processor unit 702.

While the embodiments are described with reference to various implementations and exploitations, it will be understood that these embodiments are illustrative and that the scope of the inventive subject matter is not limited to them. In general, techniques for detecting coverage holes in a communication network as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for network communication, the method comprising:
   receiving a first message at a client device from a first network device of a communication network;
   determining, by the client device, that the first message includes a reserved network identifier indicating that the first network device is configured in a temporary access point configuration;
   determining, by the client device, whether a non-reserved network identifier is received at the client device from a second network device of the communication network, in response to determining that the first message includes the reserved network identifier; and
   determining that the client device is in a coverage hole, in response to determining that the non-reserved network identifier is not received at the client device.

2. The method of claim 1, further comprising:
   establishing a communication link between the client device and the second network device, in response to determining that the non-reserved network identifier is received at the client device.

3. The method of claim 1, further comprising:
   establishing a first communication link between the client device and the first network device using the reserved network identifier after determining that the client device is in a coverage hole; and
   transmitting a notification from the client device to the first network device to indicate that the client device is in a coverage hole and to cause the first network device to change from the first temporary access point configuration to an access point configuration.

4. The method of claim 3, further comprising:
   receiving the non-reserved network identifier after the first network device changes from the temporary access point configuration to the access point configuration; and
   establishing a second communication link between the client device and the first network device using the non-reserved network identifier.

5. The method of claim 4, wherein the reserved network identifier is a reserved service set identifier (SSID) and the non-reserved network identifier is a non-reserved SSID.

6. The method of claim 3, wherein the first network device provides the reserved network identifier to the client device when in the temporary access point configuration and provides the non-reserved network identifier to the client device when in the access point configuration.

7. The method of claim 1, further comprising:
transmitting, from the client device, a notification to a coordinating device of the communication network to indicate that the client device is in a coverage hole, the coordinating device causing the first network device to change from the temporary access point configuration to an access point configuration; and
receiving, at the client device, the non-reserved network identifier from the first network device in response to the first network device changing to the access point configuration.

8. The method of claim 7, further comprising:
establishing a communication link between the client device and the first network device using the non-reserved network identifier.

9. The method of claim 7, wherein the notification includes coverage hole information, further comprising:
determining, at the client device, the coverage hole information including a location of the client device.

10. The method of claim 9, wherein the location of the client device is determined based on a device identifier of the first network device.

11. The method of claim 7, wherein said transmitting the notification to the coordinating device comprises:
transmitting the notification from the client device to the coordinating device via an out-of-band communication protocol.

12. The method of claim 11, wherein the communication network is a wireless local area network (WLAN), and wherein transmitting the notification from the client device to the coordinating device via the out-of-band communication protocol comprises transmitting the notification via at least one member of the group consisting of a powerline communication (PLC) network and a cellular network.

13. The method of claim 1, wherein the first network device is configured to temporarily change from a client device configuration to the temporary access point configuration to transmit the reserved network identifier, and change from the temporary access point configuration back to the client device configuration after transmitting the reserved network identifier.

14. The method of claim 1, further comprising:
requesting user input indicating whether to transmit a notification to a coordinating device of the communication network indicating that the client device is in a coverage hole.

15. The method of claim 1, further comprising:
determining that a second message including the non-reserved network identifier is received at the client device from the second network device;
determining, at the client device, a performance measurement associated with the second message; and
determining whether to establish a communication link between the client device and the second network device based, at least in part, on the performance measurement associated with the second message.

16. The method of claim 1, wherein the reserved network identifier indicating that the first network device is configured in the temporary access point configuration further indicates that the first network device will not establish a communication link with the client device unless the client device is in a coverage hole.

17. The method of claim 1, wherein the first message is a beacon message or a probe response message.

18. A first network device comprising:
a processor; and
a coverage hole detection unit coupled with the processor, the coverage hole detection unit configured to:
receive a first message from a second network device of a communication network;
determine that the first message includes a reserved network identifier indicating that the second network device is configured in a temporary access point configuration;
determine whether a non-reserved network identifier is received from a third network device of the communication network, in response to determining that the first message includes the reserved network identifier; and
determine that the first network device is in a coverage hole, in response to determining that the non-reserved network identifier is not received at the first network device.

19. The first network device of claim 18, wherein the coverage hole detection unit is further configured to:
transmit a notification from the first network device to a coordinating device of the communication network to indicate that the first network device is in a coverage hole, the coordinating device causing the second network device to change from the temporary access point configuration to an access point configuration; and
receive the non-reserved network identifier from the second network device in response to the second network device changing to the access point configuration.

20. The first network device of claim 19, wherein the coverage hole detection unit is further configured to:
establish a communication link between the first network device and the second network device using the non-reserved network identifier.

21. The first network device of claim 18, wherein the coverage hole detection unit is further configured to:
establish a communication link between the first network device and the third network device, in response to determining that the non-reserved network identifier is received at the first network device.

22. The first network device of claim 18, wherein the coverage hole detection unit is further configured to:
establish a first communication link between the first network device and the second network device using the reserved network identifier after determining that the first network device is in a coverage hole; and
transmit a notification from the first network device to the second network device to indicate that the first network device is in a coverage hole and to cause the second network device to change from the temporary access point configuration to an access point configuration.

23. The first network device of claim 22, wherein the coverage hole detection unit is further configured to:
receive the non-reserved network identifier after the second network device changes from the first temporary access point configuration to the access point configuration; and
establish a second communication link between the first network device and the second network device using the non-reserved network identifier.

24. The first network device of claim 18, wherein the first network device and the second network device are hybrid network devices that are configured to communicate using a wireless local area network (WLAN) protocol and at least one member selected from the group consisting of a powerline communication (PLC) protocol and a cellular communication protocol.

25. A non-transitory machine-readable storage medium having machine executable instructions stored therein, the machine executable instructions comprising instructions to:
- receive a first message at a client device from a first network device of a communication network;
- determine that the first message includes a reserved network identifier indicating that the first network device is configured in a temporary access point configuration;
- determine whether a non-reserved network identifier is received from a second network device of the communication network, in response to determining that the first message includes the reserved network identifier; and
- determine that the client device is in a coverage hole, in response to determining that the non-reserved network identifier is not received at the client device.

26. The non-transitory machine-readable storage medium of claim 25, wherein said instructions further comprise instructions to:
- transmit a notification from the client device to a coordinating device of the communication network to indicate that the client device is in a coverage hole, the coordinating device causing the first network device to change from the temporary access point configuration to an access point configuration; and
- receive the non-reserved network identifier from the first network device in response to the first network device changing to the access point configuration.

27. The non-transitory machine-readable storage medium of claim 26, wherein said instructions comprise instructions to:
- establish a communication link between the client device and the first network device using the non-reserved network identifier.

28. The non-transitory machine-readable storage medium of claim 25, wherein said instructions comprise instructions to:
- establish a first communication link between the client device and the first network device using the reserved network identifier; and
- transmit a notification from the client device to the first network device to indicate that the client device is in a coverage hole and to cause the first network device to change from the temporary access point configuration to an access point configuration.

29. The non-transitory machine-readable storage medium of claim 28, wherein said instructions comprise instructions to:
- receive the non-reserved network identifier after the first network device changes from the temporary access point configuration to the access point configuration; and
- establish a second communication link between the client device and the first network device using the non-reserved network identifier.

* * * * *